(12) United States Patent
Bessy et al.

(10) Patent No.: US 11,795,840 B2
(45) Date of Patent: Oct. 24, 2023

(54) ASSEMBLY FOR SUPPORTING AND GUIDING A DRIVE SHAFT FOR AN AIRCRAFT TURBINE ENGINE

(71) Applicant: SAFRAN AIRCRAFT ENGINES, Paris (FR)

(72) Inventors: Arnaud Bessy, Moissy-Cramayel (FR); Laurent Leeder, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 55 days.

(21) Appl. No.: 17/615,750

(22) PCT Filed: May 29, 2020

(86) PCT No.: PCT/FR2020/050921
§ 371 (c)(1),
(2) Date: Dec. 1, 2021

(87) PCT Pub. No.: WO2020/245528
PCT Pub. Date: Dec. 10, 2020

(65) Prior Publication Data
US 2022/0316359 A1  Oct. 6, 2022

(30) Foreign Application Priority Data

Jun. 3, 2019  (FR) ...................................... 1905866

(51) Int. Cl.
*F01D 25/16* (2006.01)

(52) U.S. Cl.
CPC ...... *F01D 25/164* (2013.01); *F05D 2220/323* (2013.01); *F05D 2240/50* (2013.01); *F05D 2240/60* (2013.01)

(58) Field of Classification Search
None
See application file for complete search history.

(56) References Cited

U.S. PATENT DOCUMENTS

| 7,524,112 B2 * | 4/2009 | Gerez | F16F 15/06 |
| | | | 384/535 |
| 8,747,054 B2 * | 6/2014 | Witlicki | F02C 7/06 |
| | | | 415/119 |

(Continued)

FOREIGN PATENT DOCUMENTS

| EP | 1 553 324 A1 | 7/2005 | |
| EP | 1553324 A1 * | 7/2005 | ........... F01D 21/045 |

(Continued)

OTHER PUBLICATIONS

International Search Report dated Sep. 9, 2020, issued in corresponding International Application No. PCT/FR2020/050921, filed May 29, 2020, 6 pages.

(Continued)

*Primary Examiner* — Juan G Flores
(74) *Attorney, Agent, or Firm* — CHRISTENSEN O'CONNOR JOHNSON KINDNESS PLLC

(57) ABSTRACT

An assembly for supporting and guiding a drive shaft for an aircraft turbine engine includes a bearing support having a cylindrical housing for receiving an outer ring of a bearing, and a device for rotationally retaining a first portion of the outer ring which is detached from its attachment to the bearing support. When the detachment occurs, the free outer peripheries of the first teeth of the first portion cooperate by wedge effect in the tangential direction with complementary inner surfaces of the housing of the bearing support and/or the free inner peripheries of the second teeth inside the housing cooperate by wedge effect in the tangential direction with complementary outer surfaces of the outer ring.

15 Claims, 8 Drawing Sheets

(56) References Cited

U.S. PATENT DOCUMENTS

| | | | | |
|---|---|---|---|---|
| 9,714,584 | B2* | 7/2017 | Morris | F16C 27/045 |
| 9,869,206 | B2* | 1/2018 | Von Berg | F16C 27/045 |
| 10,480,572 | B2* | 11/2019 | Smedresman | F01D 25/183 |
| 2005/0152626 | A1* | 7/2005 | Gerez | F01D 21/045 |
| | | | | 384/99 |
| 2005/0220384 | A1 | 10/2005 | Plona | |
| 2012/0189429 | A1* | 7/2012 | Witlicki | F16C 27/045 |
| | | | | 384/563 |
| 2016/0369652 | A1* | 12/2016 | Morris | F16F 9/30 |
| 2017/0362958 | A1* | 12/2017 | Von Berg | F16C 27/045 |
| 2019/0323555 | A1* | 10/2019 | Smedresman | F16C 33/66 |

FOREIGN PATENT DOCUMENTS

| | | | |
|---|---|---|---|
| FR | 2 841 592 | A1 | 1/2004 |
| FR | 2 961 865 | A1 | 12/2011 |
| FR | 3 022 312 | A1 | 12/2015 |

OTHER PUBLICATIONS

Written Opinion dated Sep. 9, 2020, issued in corresponding International Application No. PCT/FR2020/050921, filed May 29, 2020, 6 pages.

English translation of Written Opinion dated Sep. 9, 2020, issued in corresponding International Application No. PCT/FR2020/050921, filed May 29, 2020, 6 pages.

International Preliminary Report on Patentability dated Dec. 7, 2021, issued in corresponding International Application No. PCT/FR2020/050921, filed May 29, 2020, 7 pages.

* cited by examiner

ASSEMBLY FOR SUPPORTING AND GUIDING A DRIVE SHAFT FOR AN AIRCRAFT TURBINE ENGINE

FIELD OF THE DISCLOSURE

The field of the present disclosure is that of aircraft turbine engines, and more particularly that of the means implemented within these turbine engines to participate in the support and guidance of a drive shaft in rotation.

The disclosure relates, more particularly, to the problem of the integrity of turbine engine when a part participating in the support and guiding of the shaft becomes disengaged, which may be caused by an excessive accidental imbalance, for example and not restrictively the breakage of a rotor blade.

BACKGROUND

The state of the art comprises, inter alia, EP-A1-1553324, FR-A1-2961865 and FR-A1-3022312.

Turbine engines, whether single or multi-spools, generally comprise one or more rolling element bearings rotatably supporting a power shaft, in particular driven by a free turbine, relative to a fixed bearing support element connected to a casing of the turbine engine.

Such a bearing is described in connection with FIG. 1. In this figure, a shaft line 1 of a high-pressure spool of a turbine engine provided with a bearing 2 is shown partially and in axial cross-section. This high-pressure body comprises in particular a high-pressure turbine disc 4 on which are mounted vanes (not shown) which are movable around a longitudinal axis X of the turbine engine. The shaft 1 is supported in rotation with respect to a fixed bearing support 3 linked to the casing (not shown) of the turbine engine by the bearing 2. This bearing 2 comprises a plurality of rolling elements 20 inserted between an outer ring 21 arranged on the side of the fixed bearing support 3 and an inner ring 22 arranged on the side of the rotating shaft 1. The outer ring 21 and inner ring 22 form rolling tracks for the rolling elements 20. The bearing 2 and the bearing support 3 form a so-called assembly 10 for supporting and guiding the shaft 1 of the turbine engine.

In the case of bearings under heavy loads, particularly in the case of blade losses, the outer rings of the bearings comprise flexible structures, commonly referred to as "squirrel cages". These flexible outer rings allow the bearings to absorb the torsional moments inherent in particular loading conditions. However, in practice, the mechanical performance of the bearings is not optimal under all operating conditions of the turbine engine.

Thus, for this reason, the assembly 10 comprises devices for axially retaining the outer ring 21 in respect to the fixed bearing support 3, in particular in order to ensure that the engine can be stopped under the best possible conditions in the event of a breakage of this outer ring, in particular under the extreme conditions of "Blade Off" type control tests. "Blade Off" is a term generally used for safety tests on engines of the turbine engine to ensure that the engine can survive a rotor blade failure inside the engine.

Such a retaining device is shown for example in FIG. 2. The retaining device 5 in this figure comprises first 52 and second 53 claw teeth which are arranged, respectively, on the ring 21 and the bearing support 3. These claw teeth (or jaw clutch teeth) 52, 53 are arranged so as to be angularly offset from one another in order to prevent any axial disengagement of the ring 21 from the bearing support 3.

Thus, this device 5 enables to axially retain a first portion 210 of the ring 21 that has been disengaged from the bearing support 3, when a second portion of the ring 21 is broken. The first portion 210 of the ring 21 can be disengaged from the bearing support 3, in particular by a torsional breakage of columns 213 of the second portion 211 connecting this first portion 210 to the bearing support 3 by means of an annular flange. This disengaged first portion 210 is driven in rotation by the rolling elements 20 (not shown here) of the bearing 2, in particular with an axial clearance J between the claw teeth 52, 53. However, this axial clearance J is not sufficient to prevent the rotation of the broken portion of the ring 21 in a shrink ring 36 of the bearing support 3. More particularly, the claw teeth 52, 53 comprise chamfers 50, 51, respectively on the bearing ring 21 and on the bearing support 3, so as to hold the assembly 10 in position. These chamfers 50, 51 collide during a rotation phase of the outer ring 21. This have the disadvantage to generate particles caused by the collision of the chamfers 50, 51 with each other, which disperse radially into an annular space 6 between the ring 21 and the bearing support 3. This can result in irreversible damage to the bearing support and the bearing.

In this context, it is interesting to overcome the disadvantages of the prior art, by proposing a reliable device for retaining an outer ring of a bearing disengaged from its bearing support, while allowing its simple and rapid assembly in a turbine engine.

SUMMARY

The disclosure thus proposes an assembly for supporting and guiding a drive shaft for an aircraft turbine engine around an axis X, comprising at least one rolling element bearing intended to be mounted around the shaft and a bearing support comprising a cylindrical housing for receiving an outer ring of the bearing, the outer ring comprising a first cylindrical portion defining a rolling track for the rolling elements, an annular flange for fixing to the bearing support and a second cylindrical portion connecting the first portion to the flange and comprising an annular row of through openings and delimiting between them columns conferring flexibility on the outer ring, the assembly comprising a device for axially retaining the first portion of the outer ring inside the housing of the bearing support when the second portion breaks and the first portion is disengaged from the bearing support, the retaining device comprising first claw teeth disposed around the first portion and configured to cooperate with complementary second claw teeth inside the housing of the bearing support.

According to the present disclosure, the first claw teeth have their outer peripheries free which are configured to cooperate by wedge effect in a tangential direction with complementary inner surfaces of the housing of the bearing support, when the aforementioned disengagement occurs, and/or the second claw teeth have their inner peripheries free which are configured to cooperate by wedge effect in a tangential direction with complementary outer surfaces of the outer ring, when the aforementioned disengagement occurs. This configuration has the advantage of generating a concentric (i.e. both axial, radial and circumferential) locking of the outer ring of the bearing inside the bearing support as soon as the connection between the first and second portions of the outer ring is broken, for example by torsion. In fact, the first portion of the outer ring is intended to be locked inside the housing of the bearing support by rotational wedging of the free peripheries of the first and/or second claw teeth with the corresponding complementary surfaces. This enables to effectively secure and stabilise the outer ring to the bearing support, in particular after the second portion has been broken off and the first portion of the outer ring has been disengaged from the bearing support.

According to the disclosure, the complementary surfaces of one of the elements are separated by a circumferential groove of the claw teeth of this element.

In this way, the circumferential groove reinforces the axial retention of the outer ring inside the bearing support (when the second portion of the outer ring breaks), while at the same time reducing the mass and bulk of the assembly in the turbine engine.

Furthermore, the complementary inner or outer surfaces, allowing the first or second claw teeth to be wedged, can thus be formed in this circumferential groove.

It should be noted that by "wedging" or "wedge effect", the present application defines a concentric and mutual locking, in particular of the free peripheries of the claw teeth of one of the elements selected from the outer ring and the bearing support, with the complementary surfaces of the other element. Thus, the claw teeth may be arranged to oppose any relative rotation (or sliding) of the outer ring with respect to the bearing support.

Furthermore, the retaining device of the present application allows to dispense with the use of chamfers, so as to considerably reduce the space requirement and simplify the manufacture and assembly of the bearing and the bearing support in the turbine engine. This also advantageously reduces the creation and projection of particles in the turbine engine due to the presence of the chamfers. Thus, the service life of the bearing and the bearing support is optimised.

In addition, the present disclosure enables to maintain sufficient function of the bearing after its outer ring has become disengaged from the bearing support, for example, which may be induced by a loss of rotor blades of a turbine engine. In particular, this enables to effectively stabilise and control a later engine shutdown of the operating turbine engine.

According to another feature of the disclosure, the first and/or second claw teeth are three to six, and each of these claw teeth has a circumferential extent about the axis X of between 60° and 180°, and in that the wedge effect is achieved after rotation of the first portion within the housing of the bearing support through an angle of between 60° and 180°.

This feature therefore allows the concentric and simultaneous locking of the claw teeth to be promoted rapidly and in a complementary manner to each other upon rotation of the disengaged first portion by at least an angle of 60° with respect to the axis X. This also has the advantage that the bearing is quickly re-centred with respect to the drive shaft after the outer ring of the bearing support.

The assembly for supporting and guiding the drive shaft according to the disclosure may comprise one or more of the following features, taken separately from each other or in combination with each other:
- the first and/or second claw teeth have their free peripheries comprising a ramp oriented circumferentially around the axis X;
- the ramp comprises a first circumferential end located at a circumference of diameter D1 and a second circumferential end located at a circumference of diameter D2 which is greater than D1;
- the complementary surfaces configured to cooperate with the claw teeth have a diameter D3 between the diameters D1 and D2;
- the number of complementary surfaces of one of the elements selected from the bearing support and the outer ring is identical to the number of claw teeth of this element A;
- the complementary surfaces are axially aligned with the claw teeth and are intended to be located in a plane P with the claw teeth of the other element;
- a ring is shrunk within the housing and comprises an inner cylindrical surface surrounding an outer cylindrical surface of the first portion of the ring to define with this surface an annular space for forming a damping oil film;
- the outer ring is entirely housed in the bearing support;
- the first claw teeth are located between the second portion and the shrink ring;
- the groove is located on the first portion of the outer ring;
- the groove is disposed upstream of the ramp of the first teeth or the complementary outer surfaces of the outer ring;
- the groove is located on an annular recess of an inner annular shell of the bearing support;
- the groove is disposed downstream of the second claw teeth or the complementary inner surfaces of the bearing support; and
- the outer ring (21) comprises an oil film compression damper (24a) around an outer cylindrical face (23b) of the first portion (210), the damper (24a) comprises annular grooves (24b) disposed on each end of the damper (24a).

The disclosure also relates to a turbine engine, in particular an aircraft turbine engine, comprising a supporting and guiding assembly having one or more of the features described above.

DESCRIPTION OF THE DRAWINGS

Other features and advantages of the disclosure will become apparent in the course of the detailed description which follows, for the understanding of which reference is made to the annexed drawings in which:

FIG. 4b is an enlarged view of the bearing support of FIG. 4a;

DETAILED DESCRIPTION

In general, in the following description, the terms "longitudinal" and "axial" describe the orientation of structural elements extending in the direction of a longitudinal axis X. This axis X may be coincident with an axis of rotation of an engine of a turbine engine. The term "radial" refers to an orientation of structural elements extending in a direction perpendicular to the axis X. The terms "inner" and "outer", and "internal" and "external" are used in reference to positioning relative to the axis X. Thus, a structural element extending along the axis X has an inner face facing the axis X and an outer face opposite its inner surface.

Figure 1:
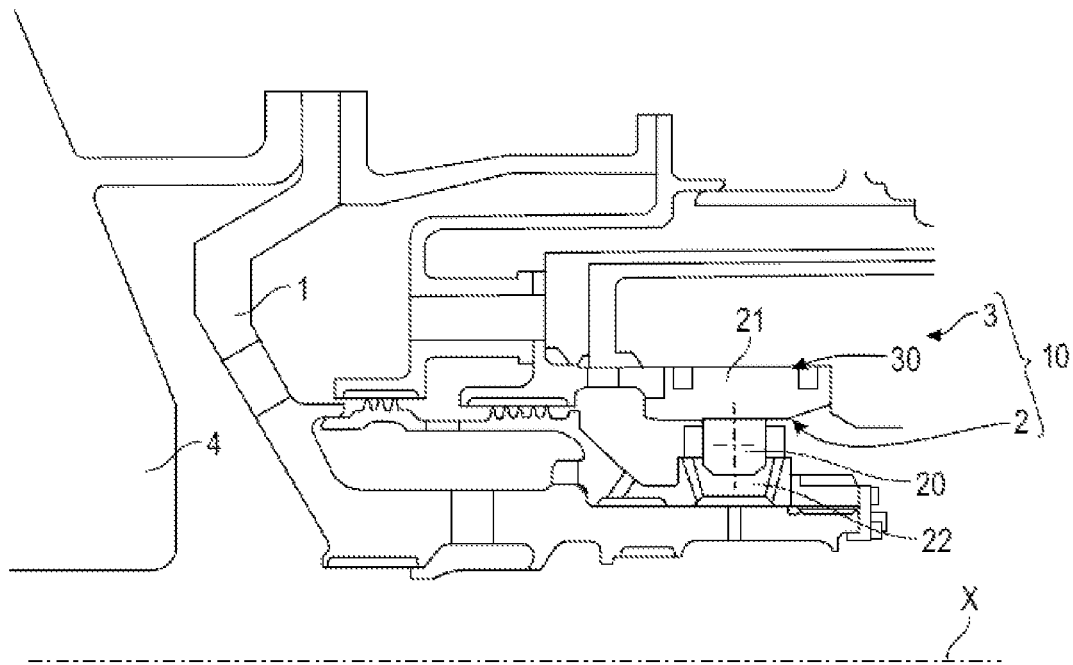
FIG. 1 is a schematic view in axial and partial section of a module of a turbine engine using a supporting and guiding assembly of the prior art.

FIG. 1 shows part of a module of an aircraft turbine engine, for example a turbojet or turboprop engine, as previously described in the technical background of the present application.

This turbine engine module comprises a bearing 2 with rolling elements 20 cooperating with a bearing support 3 to form an assembly 10 for supporting and guiding a shaft 1 for driving in rotation about a longitudinal axis X. More particularly, the shaft 1 is supported in rotation with respect to the bearing support 3 which is generally fixed and connected to a casing (not shown) of the turbine engine by the bearing 2. An outer ring 21 of the bearing 2 is arranged in a cylindrical housing 30 of the bearing support 3. This ring 21 is secured to the bearing support 2 by an annular fixing flange connecting the ring 21 to the bearing support 3, for example by bolt-type fasteners (not shown in FIG. 1).

Figure 2:
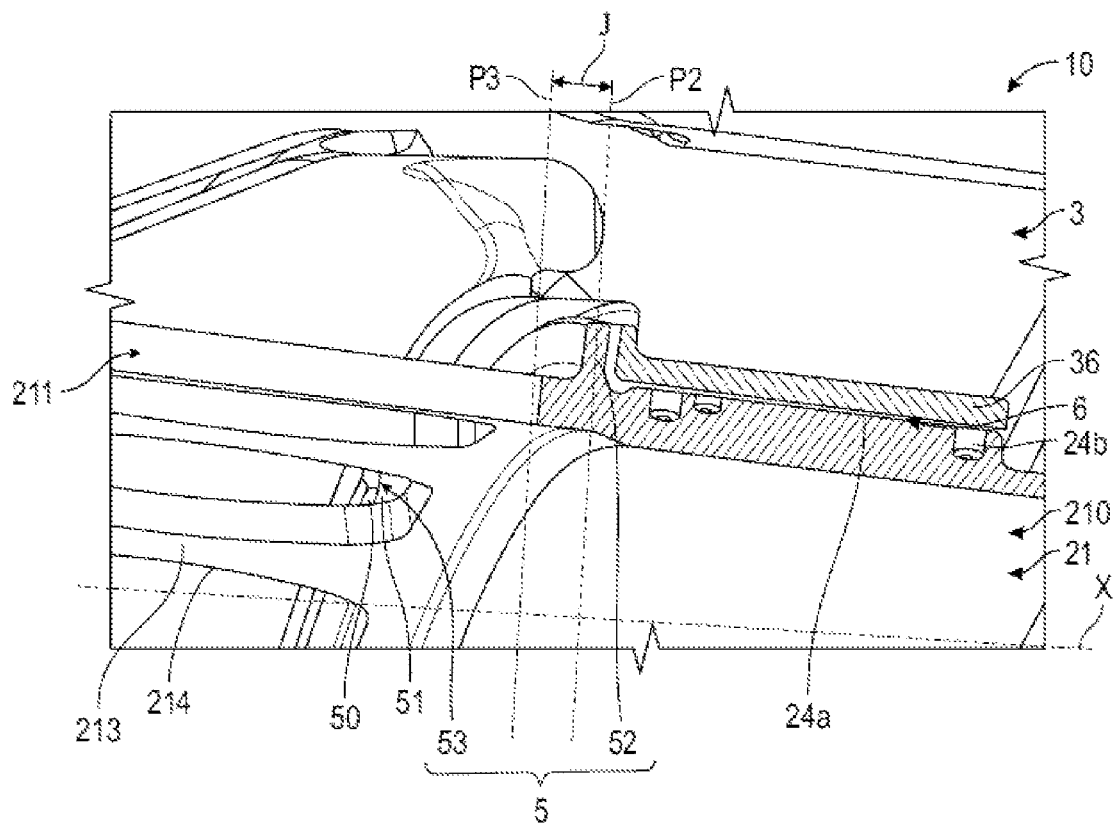
FIG. 2 is a schematic axial and partial cross-sectional view of an axial retaining device of a supporting and guiding assembly according to the prior art.

FIG. 2 shows the prior art assembly 10 for supporting and guiding the shaft 1 according to the prior art, as previously described in the technological background of the present application. This prior art assembly 10 comprises an device 5 for axially retaining a first portion 210 of the ring 21 of the bearing 2 inside the housing 30 of the bearing support 3. This retaining device 5 comprises claw teeth 52, 53 arranged on both the ring 21 and the bearing support 3 so as to axially retain the ring 21 within the bearing support 3 when the attachment between these two elements 21, 3 is disengaged.

According to the disclosure, the assembly 10 for supporting and guiding the shaft 1 can also be installed in the turbine engine module of FIG. 1. The assembly 10 and/or one of the elements 21, 3 of this assembly 10 of the disclosure are illustrated in FIGS. 3 to 9.

A particular feature of the disclosure is that the retaining device 5 is intended to achieve a concentric locking of the ring 21 inside the bearing support 3.

Figure 3:
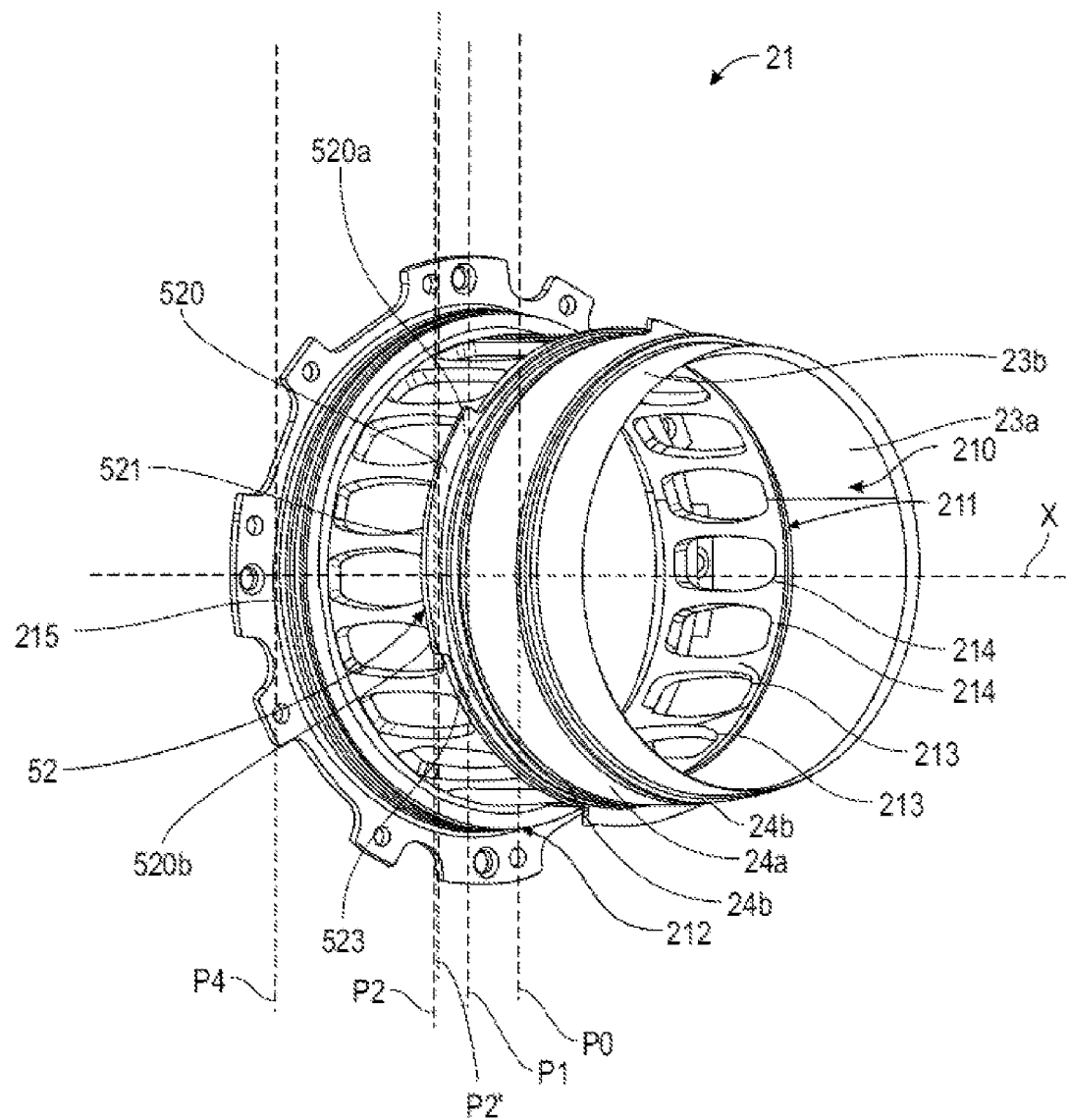
FIG. 3 is a partial schematic perspective view of an outer ring of a rolling element bearing according to the disclosure.

FIG. 3 shows a partial view of the outer ring 21 of the bearing 2 according to the disclosure. The ring 21 is a hollow cylindrical part extending around a longitudinal axis which may be coincident with the axis X of the turbine engine. This ring 21 comprises, from upstream to downstream, an annular fixing flange 212, a second cylindrical portion 211 and a first cylindrical portion 210 which are integral.

The flange 212 extends outwards from a peripheral edge 215 of the ring 21. This peripheral edge 215 passes substantially through a plane P4 which is perpendicular to the axis X and disposed on the upstream side of the ring 21.

The second portion 211 comprises columns 213 which are regularly distributed around the second portion 211 and through openings 214 separating the columns 213 from each other. The openings 214 and the columns 213 have an identical axial length, but may have a different peripheral width. The width of the openings 214 is preferably greater than that of the columns 213, so as to provide flexibility to this second portion 211. These columns 213 and openings 214 may extend axially between 50% and 90% of the total axial length of the second portion 211.

The first portion 210 comprises an inner cylindrical face 23a configured to be disposed on the bearing 2 side and an outer cylindrical face 23b configured to be disposed on the bearing support 3 side.

First claw teeth 52 are disposed around the outer face 23b of the first portion 210 and pass substantially through a plane P2' transverse to the axis X. Each first claw tooth 52 has a circumferential extent of between 60° and 180° about the axis X. For example, in FIG. 3, there are three first claw teeth 52 distributed at 120° equidistant from each other.

Figure 6:
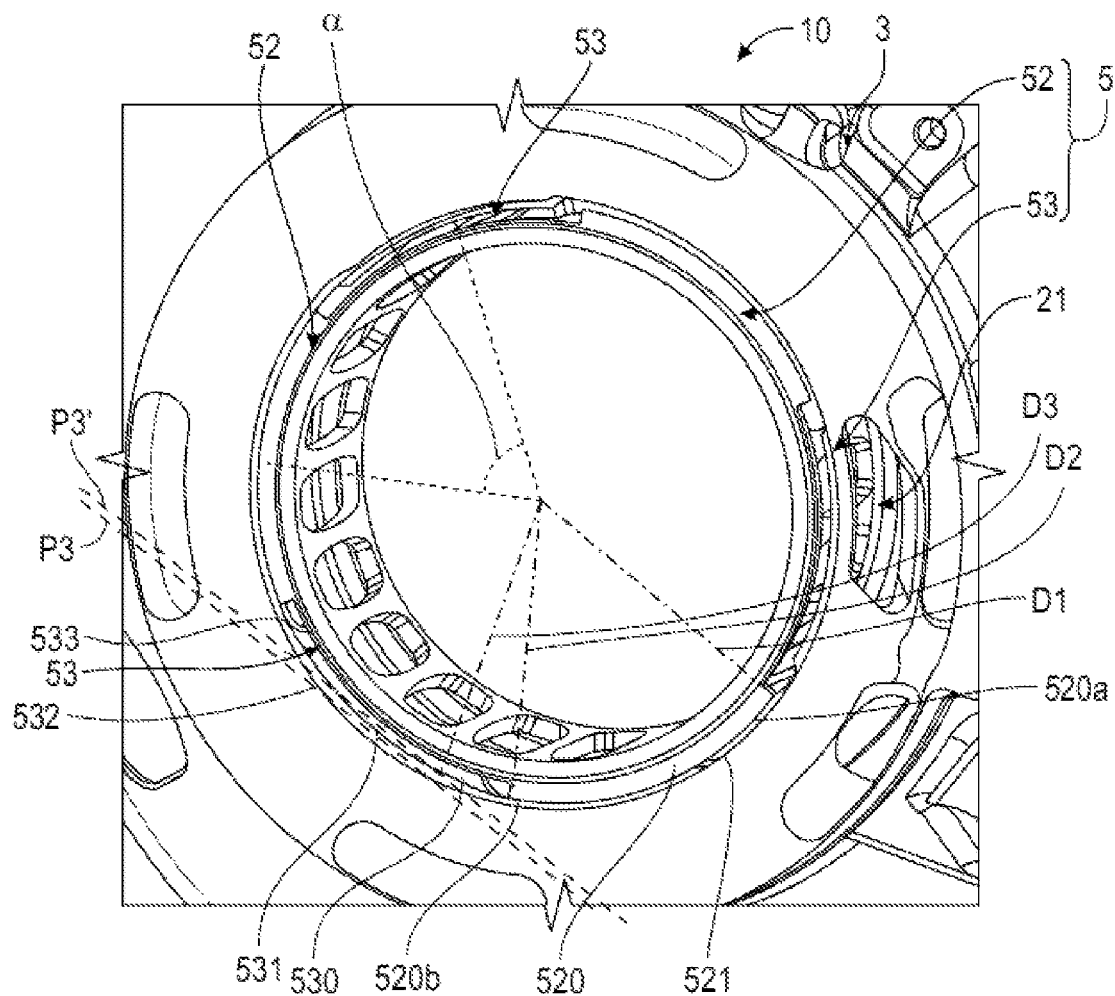
FIG. 6 is a partial schematic cross-sectional view of a retaining device according to the assembly of FIG. 5 and before the outer ring of FIG. 3 is disengaged from the bearing support of FIGS. 4a and 4b.
Figure 7:
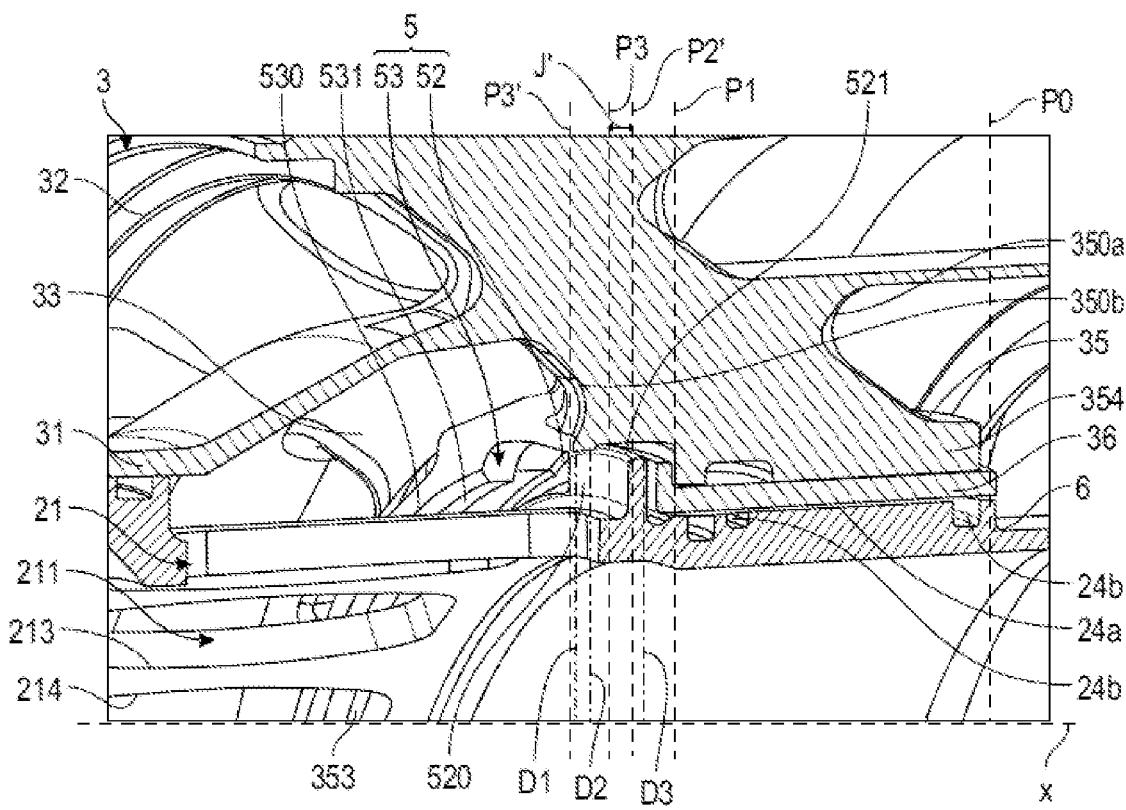
FIG. 7 is a partial schematic cross-sectional view of the retaining device of the assembly of FIGS. 5 and 6.

Each first claw tooth 52 comprises a ramp 520 on its free outer periphery 521. The ramp 520 is disposed on the side of the second portion 211 and passes substantially through the plane P2'. The ramp 520 comprises a first circumferential end 520a located at a circumference of diameter D1 and a second circumferential end 520b located at a circumference of diameter D2 (FIGS. 6 and 7). The diameter D2 being greater than the diameter D1 (i.e. the outer diameters relative to the axis of revolution of the outer ring), for example so that the outer periphery 521 of the ramp 520 has a generally elliptical arc shape. The diameter D1 may be between 5% and 50% smaller than the diameter D2, representing the maximum diameter of the ramp 520. The first 520a and second 520b ends circumferentially bound the ramp 520 with the aforementioned circumferential extent. For example, in FIG. 3, the first 520a and second 520b are disposed substantially between 90° and 120° about the axis X. The circumferential extent and the diameters D1, D2 of the ramp 520 are, for example, chosen according to the dimensions of the ring 21, the speed of rotation of the drive shaft 1 and/or the type of turbine engine.

The outer face 23b further comprises a circumferential groove 523 that is disposed upstream of the ramp 520 and adjacent to the second portion 211. The groove 523 may have an annular shape extending circumferentially around the outer face 23b of the first portion 210.

According to a second embodiment of the disclosure not shown in the figures of the present application, outer surfaces (so-called wedging surfaces) may be arranged around the outer face 23b of the first portion 210. The outer surfaces may be separated by the groove 523 of the first claw teeth 52. The outer surfaces may pass substantially through a plane P2 that is parallel and upstream of the plane P2' of the first claw teeth 52. Each outer surface may extend circumferentially about the axis X with a circumference of diameter D3' (this will also be the outer diameter relative to the axis of revolution of the outer ring). The diameter D3' may be less than the maximum outer diameter of the ramp 520. The outer surfaces may have a general elliptical arc shape similar to the outer periphery 521 of the ramp 520.

An oil film compression damper 24a (or "squeeze film damper" SQF) may be disposed around the outer face 23b. More particularly, this damper 24a extends axially between a plane P1 disposed on the side of the first claw teeth 52 and a plane P0 disposed on the downstream side of the first portion 210. These planes P0 and P1 are perpendicular to the axis X. Furthermore, the damper 24a may comprise annular grooves 24b disposed on each end of the damper 24a. These annular grooves 24b may be configured to receive open annular segments, so as to allow oil leakage axially from the damper 24a to the outside of the ring 21.

Figure 4A:
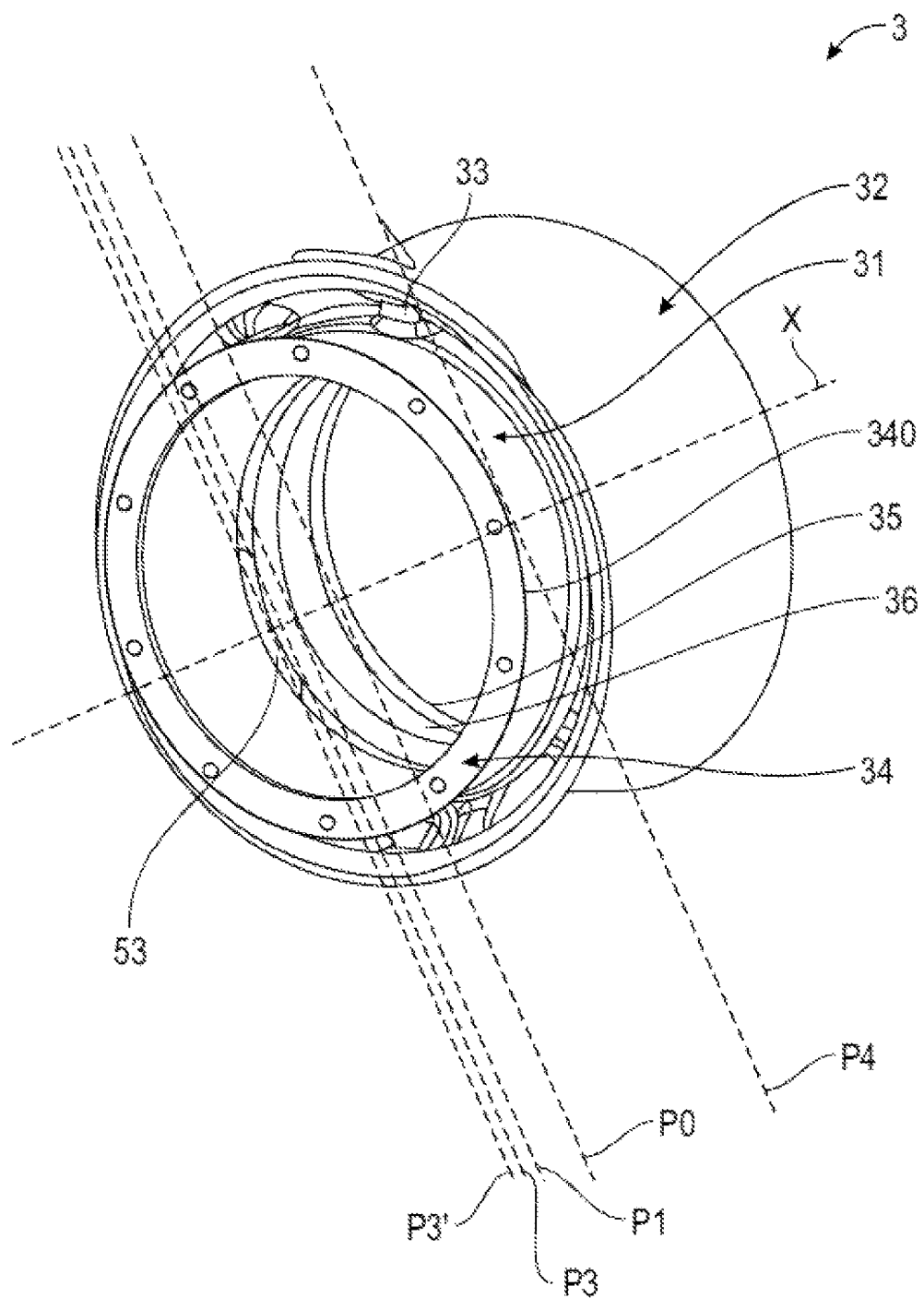
FIG. 4a is a schematic perspective view of a bearing support according to the disclosure.
Figure 4B:
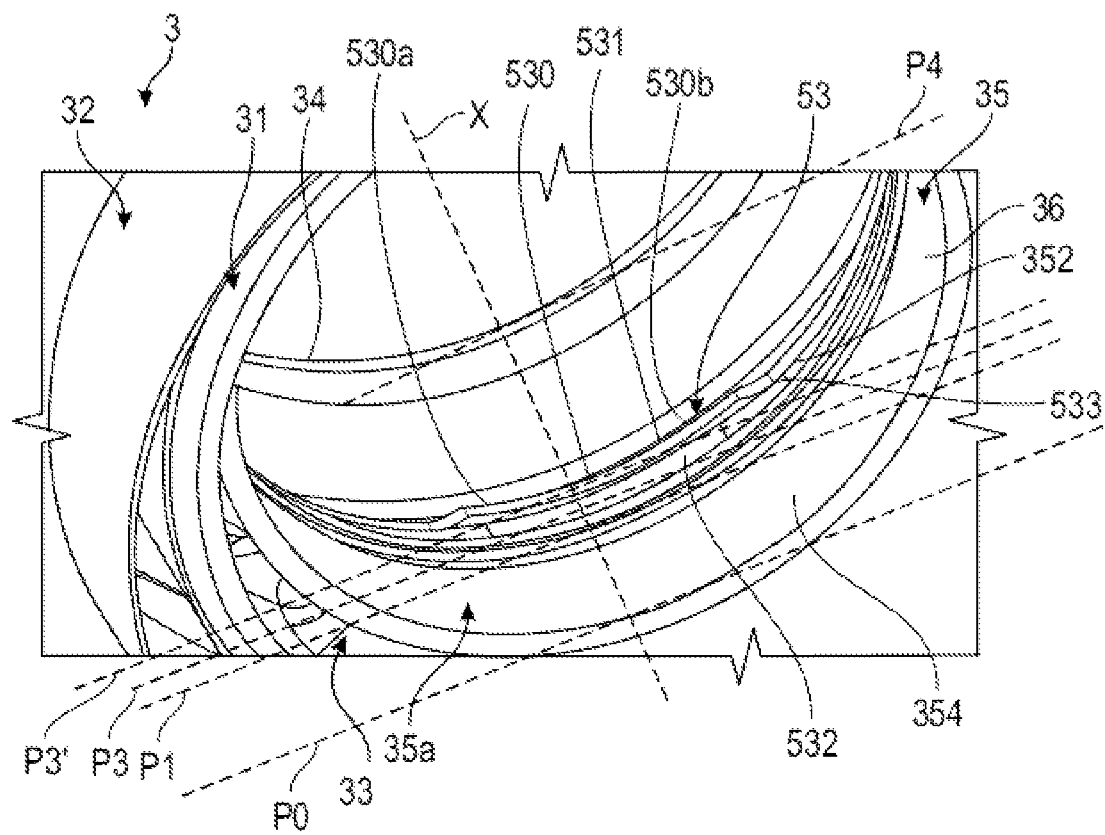

With reference to FIGS. 4a and 4b, the bearing support 3 has a form of revolution extending around a longitudinal axis which may be coincident with the axis X of the turbine engine. The bearing support 3 comprises two annular inner 31 and outer 32 walls which are connected to each other by arms 33. The outer wall 32 is configured to connect to a casing of the turbine engine and the inner wall 31 is configured to connect and cooperate with the outer ring 21 of the bearing 2. The arms may be solid or tubular (or otherwise said to be hollow) for example for the passage of servos. The bearing support 3 further comprises an inner annular shell 35 which extends radially inwards from the inner wall 31. The arms 33, inner ring 35, inner wall 31 and outer wall 32 are integral.

The inner wall 31 may comprise a fixing flange 34 extending inwardly from a peripheral edge 340. This peripheral edge passes substantially through a plane P4 transverse to the axis X and which is disposed upstream of the bearing support 3.

The shell 35 may comprise outer peripheral edges 350a, 350b connecting the shell 35 to the inner wall 31 (visible in FIG. 7).

The shell 35 comprises an inner cylindrical face 35a comprising, from upstream to downstream, second claw teeth 53, an annular recess 353 and a downstream end 354.

The second claw teeth 53 are arranged on an inner peripheral edge 352 which passes substantially through a plane P3' transverse to the axis X. Each second claw tooth 53 may have a circumferential extent of between 60° and 180° about the axis X. For example, the second claw teeth 53 are three in number, distributed at 120° equidistant from each other.

The annular recess 353 further comprises a circumferential groove 533 which is disposed downstream of the second claw teeth 53. This groove is arranged downstream of the plane P3' of the second claw teeth 53. The groove 533 may have an annular shape extending circumferentially around the inner face 35a of the shell 35.

Inner surfaces 532 are disposed around the inner face 35b of the shell. These inner surfaces 532 (also known as wedging surfaces) are configured to co-operate in a complementary manner with the outer peripheries 521 of the ring 21. The inner surfaces 532 pass substantially through a plane P3 parallel to and downstream of the plane P3'. The inner surfaces 532 are separated by the groove 533 from the second claw teeth 53. Each inner surface 532 extends circumferentially around the axis X with a circumference of diameter D3 (i.e. the inner diameter with respect to the axis of revolution of the bearing support). The diameter D3 of the inner surfaces 532 may be smaller than the minimum inner diameter of the second claw tooth 53. Preferably, the diameter D3 is between the diameters D1 and D2 of the ramp 520 of the ring 21. The inner surfaces 532 may have a generally elliptical arc shape similar to the outer periphery 521 of the ramp 520.

An annular shrink ring 36 is disposed around the downstream end of the inner cylindrical face 35a of the shell 35. This shrink ring 36 extends substantially between a plane P1 disposed on the side of the second claw teeth 53 and a plane P0 disposed on the downstream side of the shell 35.

The annular recess 353 of the shell 35 extends substantially between the plane P3 of the second claw teeth 53 and the plane P1 of the shrink ring 36.

According to a second embodiment of the disclosure not shown in the figures of the present application, each second claw tooth 53 may comprise a ramp on its free outer periphery 531. This ramp passes substantially through the plane P3' of the second claw tooth 53. This ramp on the free outer periphery is configured to co-operate in a complementary manner with one of the outer surfaces of the ring 21. The ramp may comprise a circumferential end located at a circumference of diameter D1' and another circumferential end located at a circumference of diameter D2' (reference is made to the inner diameters with respect to the axis of revolution of the bearing support). The diameter D2' being greater than the diameter D1', for example so that the inner periphery 531 of the ramp has a generally elliptical arc shape. The diameter D1' may be between 5% and 50% smaller than the diameter D2'. The circumferential extent and the diameters D1', D2' of the ramp are for example chosen according to the dimensions of the bearing support 3, the rotational speed of the drive shaft 1 and/or the type of turbine engine. The diameters D1', D2' and D3' are not shown in the figures.

FIGS. 5 to 9 represent different schematic views of the assembly 10 of the disclosure comprising the outer ring 21 assembled with the bearing support 3.

Figure 5:
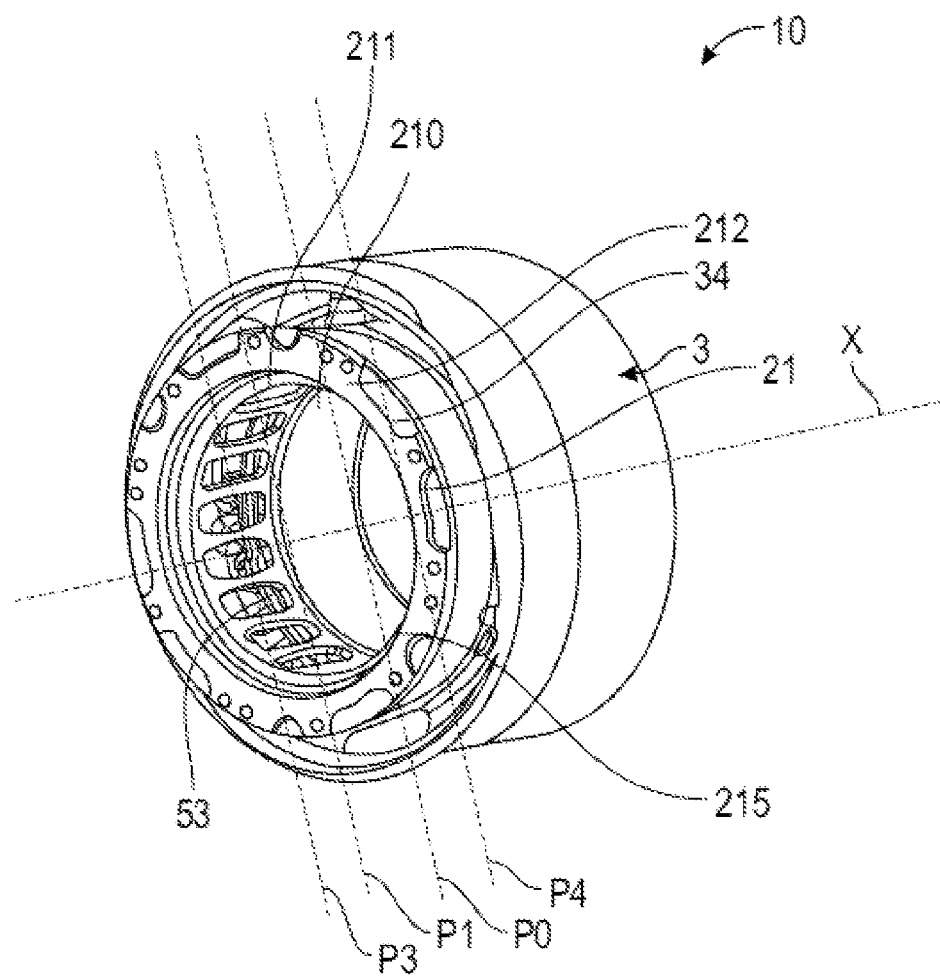
FIG. 5 is a schematic perspective view of an assembly of the outer ring of FIG. 3 and the bearing support of FIGS. 4a and 4b.
Figure 8:
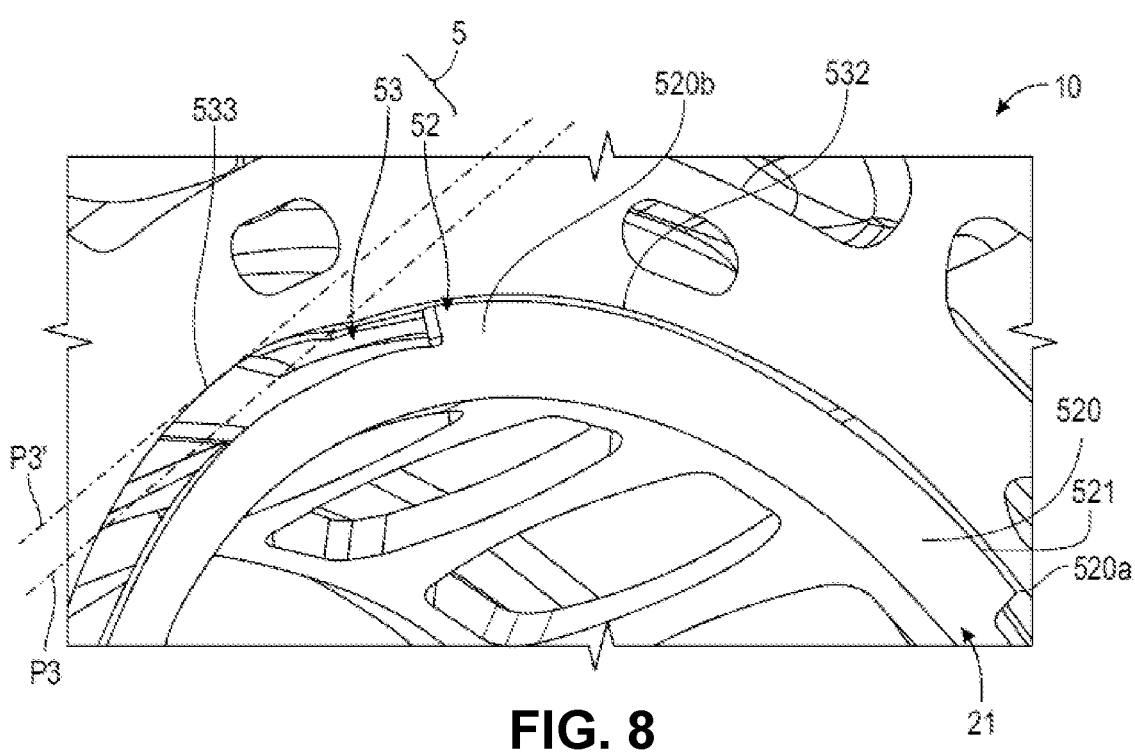
FIG. 8 is a partial schematic half sectional view of the retaining device according to the assembly of FIG. 5 and after the outer ring of FIG. 3 has been disengaged from the bearing support of FIGS. 4a and 4b.

More particularly, FIGS. 5 to 7 represent the assembly 10 according to the disclosure, in which the retaining device 5 is at rest (i.e. without disengagement of the ring 21) and FIG. 8 represents the assembly 10 according to the disclosure in which the retaining device 5 is deployed to achieve the wedge effect (i.e. after disengagement of the ring 21 from the bearing support 3).

FIG. 5 shows the attachment of the ring 21 to the bearing support 3 by means of the attachment flanges 212, 34 and passing substantially through the plane P4. Preferably, the flange 212 of the ring 21 is connected to the flange 34 of the inner wall 31 of the bearing support 3 by bolt-type fasteners. This ensures that the outer ring 21 of the bearing 2 is secured to the bearing support 3.

With reference to FIGS. 5 and 6, the second portion 211 of the ring 21 is disposed in the inner wall 31 upstream of the bearing support 3 and extends at least substantially between plane P4 and plane P3'. The columns 213 of the second portion 211 are strong and integral with the ring 21, so as to connect the first portion 210, which is suitable for cooperating with the mobile bearing 2, to the fixed bearing support 3.

The first portion 210 of the ring 21 is arranged coaxially with the inner shell 35 of the bearing support 3 and they extend at least substantially between the plane P3' and the plane P0. More particularly, the downstream end of the first portion 210, which comprises in particular the damper 24a and the annular grooves 24b, is arranged coaxially with the downstream end 354 of the shell 35, which comprises in particular the shrink ring 36, and extend at least substantially between the plane P1 and the plane P0. An annular space 6 with a small radial clearance is formed between the shrink ring 36 of the bearing support 3 and the damper 24a of the ring 21, in particular to ensure a minimum of oil lubrication and sealing of the assembly 10.

The outer ring 21 is assembled within the housing 30 of the bearing support 3, in particular by axial engagement, so that the first claw teeth 52 of the ring 21 pass between the claw teeth 53 of the bearing support 3. The first claw teeth 52 of the ring 21 engage in the annular recess 353 of the bearing support 3. This allows the first claw teeth 52 to be arranged angularly offset by an angle α, and behind the second claw teeth 53. The angle α may be between 20° and 60°. Preferably, the first claw teeth 52 are offset by an angle of 60° from the second claw teeth 53, when the assembly 10 comprises three claw teeth (FIG. 6). Furthermore, the first claw teeth 52 are axially spaced from the second claw teeth 53, in particular with an axial clearance J'. The axial clearance J' extends between the plane P3 and the plane P2'. Preferably, the first claw teeth 52 are radially aligned in the plane P3 of the inner surfaces 531 of the bearing support 3.

Advantageously, in resting operation of the retaining device 5 (FIGS. 6 and 7), for example prior to torsional break of the columns 213, the ring 21 moves radially until contact is made between the shrink ring 36 of the bearing support 3 and the damper 24a of the ring 21. The unbalance of the drive shaft 1 and the rotation of the bearing 2 allow the ring 21 to roll inside the shrink ring 36. This generates a torque in the ring 21 which is supported by the columns 213. This torque increases until the resulting tangential force causes the outer ring 21 of the bearing to slide on the shrink ring 36 of the bearing support.

In FIG. 8, the retaining device 5 according to the disclosure assumes a configuration different from its operation at rest, in particular in the case where the second portion 211 is broken. For example, a loss of rotor blades may cause the columns 213 to break in torsion (not shown). The first portion 210 is therefore disengaged from the fixed second portion 211, and is rotated by the rolling elements 20 of the bearing 2 as described previously in the technological background of the present application.

In order to limit the rotation of this first portion 210, one of the free peripheries 521, 531 of the claw teeth of one of the elements 21, 3 rotatably wedges with one of the complementary surfaces 532 of the claw teeth of the other element 3, 21.

In the example shown in FIG. 8, this wedge effect lock of the claw teeth allows the inner surfaces 532 to be axially and radially aligned complementarily with the ramps 520 of the free outer peripheries 521 of the first claw teeth 52 which pass substantially through a plane P which is perpendicular to the axis X.

The plane P aligning the ramps 520 of the ring 21 and the inner surfaces 532 of the bearing support 3 substantially corresponds to the plane P3. Thus, after the ramps 520 are fully wedged with the inner surfaces 532, the first claw teeth 52 of the ring 21 are intended to be located on the plane P3 which is placed downstream of the plane P3' of the second claw teeth 53 of the bearing support 3.

In the case of the second embodiment (not shown in the figures), the ramps of the second claw teeth 53 may be axially and radially aligned with the complementary outer surfaces of the ring 21. In this configuration, the first claw teeth 52 are intended to be arranged in the plane P2 which is also located behind the plane P3' of the second claw teeth 53, after full wedging of the ramps of the bearing support 3 with the complementary outer surfaces of the ring 21.

Preferably, the simultaneous wedge effect of the claw teeth 52, 53 of one of the elements 21, 3 on the complementary surfaces of the other element 3, 21 can be achieved as soon as the first portion 210 of the ring 21 has rotated by at least 60° about the axis X. These snap teeth 52, 53 fully wedge onto the appropriate complementary surfaces of one of the elements 3, 21 when the first portion 210 has rotated by a maximum of 180° about the axis X.

Advantageously, after the torsional breakage of the columns 213, this torsional force, which is connected to a reptation under strong unbalance of the drive shaft 1 and after consumption of the damper 24a, allow the free peripheries 521, 531 to be plasticized respectively with the complementary surfaces 532 of the claw teeth 52, 53 during their wedging in rotation. In this way, the first portion 210 disengaged from the ring 21 is completely and irreversibly embedded inside the housing 30 of the bearing support 3.

Figure 9:
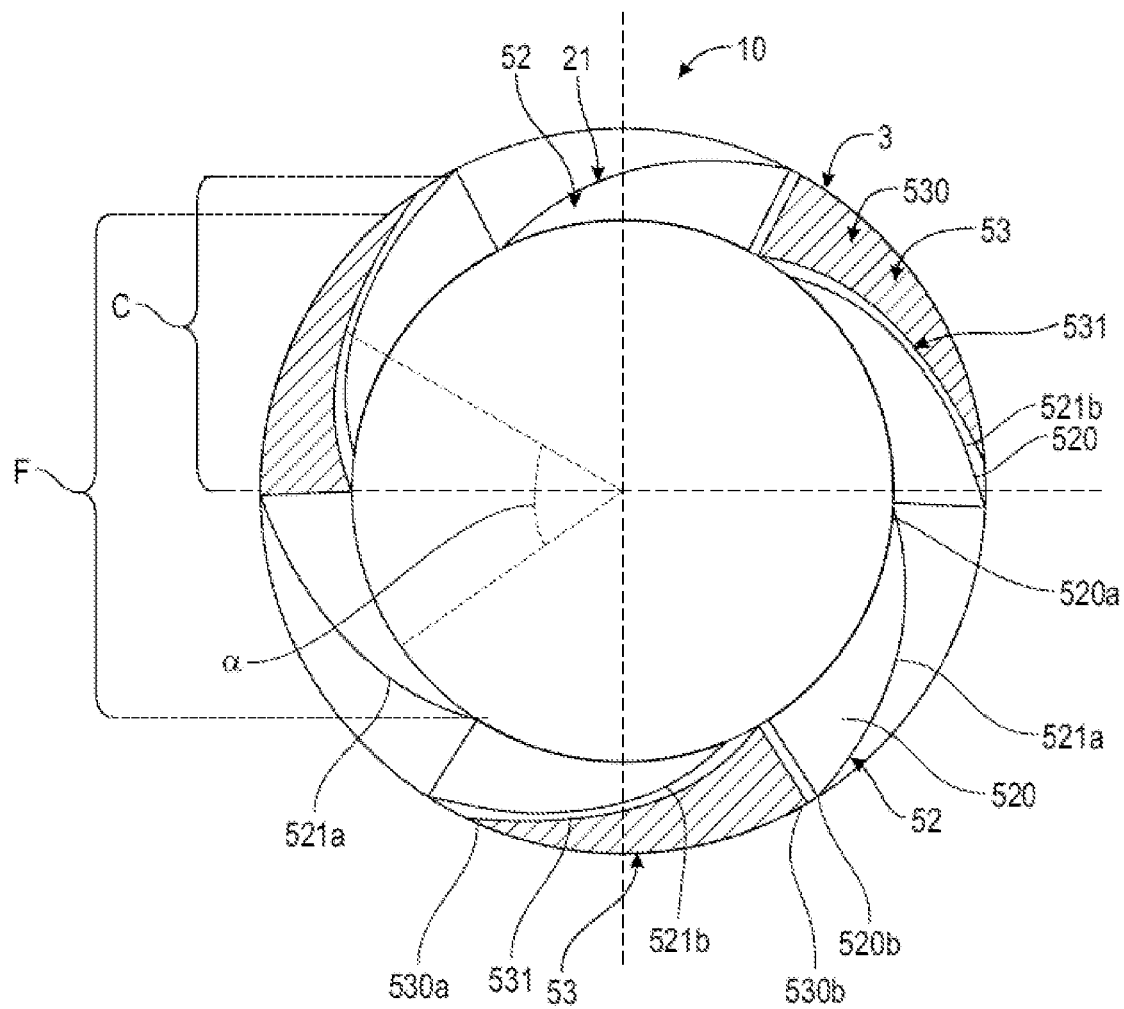
FIG. 9 schematically represents the general principle of the retaining device according to the disclosure at rest and with wedge effect.

FIG. 9 schematically represents the operating principle of the retaining device of the present application.

The retaining device 5 is at rest F, when the claw teeth of one of the elements 21, 3 are offset angularly (in particular by the angle α) and axially (in particular by the axial clearance J' not visible in FIG. 9) from the other claw teeth of the other element 3, 21.

The retaining achieves the wedge effect C, when the claw teeth of one of the elements 21, 3 are angularly and axially aligned with the other claw teeth of the other element 3, 21.

The disclosure provides several advantages which are, especially:
- keeping the outer ring disengaged (in particular broken in torsion) from the bearing support, in particular by a wedging effect of the claw elements between them,
- to effectively stabilise the drive shaft of the turbine engine, particularly in the event of blade loss,
- to maintain the function of the rolling element bearing after the outer ring has been detached from the bearing support,
- re-centre the drive shaft after the outer ring has been disengaged from the bearing,
- limit the degradation of the bearing and the bearing support during operation,
- reduce the impact on the turbine engine after the outer ring has been disengaged from the bearing (in particular, by avoiding chamfers on the claw member),
- simplify and unclutter the assembly and operation of the retaining device on the turbine engine;
- be easily adapted to current turbine engines.

Overall, this proposed solution is simple, effective and economical to build and assemble on a turbine engine, while enhancing the life of the bearing and bearing support in operation.

The invention claimed is:

1. An assembly for supporting and guiding a drive shaft for an aircraft turbine engine about an axis, said assembly comprising at least one rolling element bearing configured to be mounted around said drive shaft and a bearing support comprising a cylindrical housing for receiving an outer ring of said at least one rolling element bearing, said outer ring comprising a first cylindrical portion defining a rolling track for said at least one rolling element bearing, an annular flange for fixing to said bearing support and a second cylindrical portion connecting the first cylindrical portion to the annular flange and comprising an annular row of through openings and delimiting between the through openings of said annular row of through openings columns conferring flexibility on the outer ring, said assembly comprising a device for axially retaining the first cylindrical portion of the outer ring inside the cylindrical housing of the bearing support when the second cylindrical portion breaks and the first cylindrical portion is disengaged from the bearing support, said device comprising first claw teeth disposed around the first cylindrical portion and configured to cooperate with complementary second claw teeth inside the cylindrical housing of the bearing support, the first claw teeth having outer peripheries free which are configured to cooperate by wedge effect in a tangential direction with inner complementary surfaces of the cylindrical housing of the bearing support, when the aforementioned disengagement occurs; and/or the complementary second claw teeth having inner peripheries free which are configured to cooperate by wedge effect in the tangential direction with outer complementary surfaces of the outer ring, when the aforementioned disengagement occurs, wherein the inner and outer complementary surfaces of a first element of the elements selected from the bearing support and the outer ring are separated by a circumferential groove from the first or complementary second claw teeth of said first element.

2. The assembly according to claim 1, wherein the first and/or complementary second claw teeth are three to six, and each of said first and complementary second claw teeth has a circumferential extent about the axis of between 60° and 120°, and the wedge effect is achieved after rotation of the first cylindrical portion within the cylindrical housing of the bearing support through an angle of between 60° and 120°.

3. The assembly according to claim 1, wherein the first and/or complementary second claw teeth have the respective free outer and inner peripheries comprising a ramp oriented circumferentially around the axis.

4. The assembly of claim 3, wherein the ramp comprises a first circumferential end located at a circumference of diameter D1 and a second circumferential end located at a circumference of diameter D2 which is greater than D1, and the inner complementary surfaces configured to cooperate with the first claw teeth have a diameter D3 between the diameters D1 and D2.

5. The assembly according to claim 1, wherein the number of inner or outer complementary surfaces of the first element of the elements selected from the bearing support and the outer ring is identical to the number of first or complementary second claw teeth of the first element, and in that the inner or outer complementary surfaces are axially aligned with the first or complementary second claw teeth and are configured to be arranged in a plane with the first or complementary second claw teeth of a second element of the elements selected from the bearing support and the outer ring.

6. The assembly according to claim 1, wherein a ring is shrunk within the cylindrical housing and comprises an inner cylindrical surface surrounding an outer cylindrical surface of the first cylindrical portion of the outer ring to define with said outer cylindrical surface an annular space for forming a damping oil film.

7. The assembly according to claim 1, wherein the outer ring is entirely housed in the bearing support.

8. The assembly according to claim 6, wherein the first claw teeth are located between the second cylindrical portion and the ring.

9. The assembly according to claim 1, wherein the circumferential groove is located on the first cylindrical portion of the outer ring.

10. The assembly according to claim 9, wherein the first and/or complementary second claw teeth have the respective free outer and inner peripheries comprising a ramp oriented circumferentially around the axis, and the circumferential groove is disposed upstream of the ramp of the first claw teeth or the outer complementary surfaces of the outer ring.

11. The assembly according to claim 1, wherein the circumferential groove is located on an annular recess of an inner annular shell of the bearing support.

12. The assembly according to claim 11, wherein the circumferential groove is disposed downstream of the complementary second claw teeth or inner complementary surfaces of the bearing support.

13. The assembly according to claim 1, wherein the outer ring comprises an oil film compression damper around an outer cylindrical face of the first cylindrical portion, the oil film compression damper comprising annular grooves disposed on each end of the oil film compression damper.

14. A turbine engine comprising an assembly for supporting and guiding according to claim 1.

15. The turbine engine according to claim 14, wherein the turbine engine is an aircraft turbine engine.

* * * * *